United States Patent [19]
Bedard et al.

[11] Patent Number: 5,013,535
[45] Date of Patent: May 7, 1991

[54] STABILIZED ALUMINOPHOSPHATE COMPOSITIONS AND PROCESS FOR PREPARING SAME

[75] Inventors: Robert L. Bedard, Fishkill; Robert L. Patton, Katonah; Stephen T. Wilson, Shrub Oak, all of N.Y.

[73] Assignee: UOP, Des Plaines, Ill.

[21] Appl. No.: 340,829

[22] Filed: Apr. 20, 1989

[51] Int. Cl.$^5$ .................... C01B 33/34; C01B 35/00
[52] U.S. Cl. .................... 423/277; 423/305; 423/306; 423/328; 502/85
[58] Field of Search .............. 423/305, 306, 277, 328, 423/329, 330; 502/85

[56] References Cited

U.S. PATENT DOCUMENTS

| | | | |
|---|---|---|---|
| 3,488,146 | 1/1970 | Reid, Jr. | 423/328 |
| 4,029,716 | 6/1977 | Kaeding | 423/328 |
| 4,310,440 | 1/1982 | Wilson et al. | 423/305 |
| 4,483,835 | 11/1984 | Zones | 423/328 |
| 4,569,833 | 2/1986 | Gortsema et al. | 502/85 |
| 4,684,511 | 8/1987 | Gortsema et al. | 502/85 |
| 4,880,611 | 11/1989 | von Ballmoos et al. | 423/328 |

FOREIGN PATENT DOCUMENTS

| | | | |
|---|---|---|---|
| 0146389 | 6/1985 | European Pat. Off. | 423/328 |
| 89/01912 | 3/1989 | PCT Int'l Appl. | |

*Primary Examiner*—H. M. S. Sneed
*Assistant Examiner*—R. Bruce Breneman
*Attorney, Agent, or Firm*—Thomas K. McBride; Richard G. Miller

[57] ABSTRACT

Aluminophosphate-based molecular sieve compositions having the crystal structure of AlPO$_4$-54 are stabilized against framework collapse or conversion to other crystal structures by treatment in their hydrated state with boric acid or salts thereof. The stabiized products are characterized, in addition to their essential AlPO$_4$-54 structure, by the presence of at least 6 ppm of extraneous boron.

18 Claims, No Drawings

1

STABILIZED ALUMINOPHOSPHATE COMPOSITIONS AND PROCESS FOR PREPARING SAME

FIELD OF THE INVENTION

The present invention relates to the stabilization of aluminophosphate based molecular sieve compositions having the characteristic crystal structure of AlPO$_4$-54 and to the resulting stabilized compositions. More particularly the invention relates to the treatment comprising contact of such aluminophosphates, preferably in their hydrated state, with an aqueous solution of boric acid or salts of boric acid to produce a stabilized composition of the same crystal structure and having an extraneous boron content of at least about 6 ppm. by weight.

DESCRIPTION OF THE PRIOR ART

A very large number of crystalline aluminophosphate based molecular sieve compositions have been synthesized within the past decade. These compositions can consist of AlO$_2$ and PO$_2$ tetrahedral units, or can contain, in addition, tetrahedral oxide units of any of a considerable number of metals including beryllium, boron, chromium, cobalt, gallium, germanium, iron, lithium, magnesium, manganese, titanium, vanadium and zinc. The aluminophosphate molecular sieves are composed of AlO$_2$ and PO$_2$ tetrahedral units only and are generally referred to as "AlPO$_4$'s", and are disclosed in U.S. Pat. No. 4,310,440 issued Jan. 12, 1982 to Wilson et al. These molecular sieves have framework structures whose chemical composition expressed in terms of mole ratios of oxides is

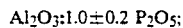
Al$_2$O$_3$:1.0±0.2 P$_2$O$_5$;

each of said framework structures being microporous in which the pores are uniform and have nominal diameters generally in the same range as the diameters of molecular species, i.e. at least about 3 Angstroms. The compositions are synthesized by the hydrothermal crystallization of aluminophosphate mixtures containing an organic structure forming templating agent. The as crystallized compositions contain water and/or organic template in their intracrystalline void space which upon removal yields microporous crystalline adsorbents with uniform pores. In general, the preparative process comprises forming a reaction mixture which in terms of molar ratios of oxides is

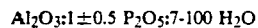
Al$_2$O$_3$:1±0.5 P$_2$O$_5$:7-100 H$_2$O and contains from about 0.2 to 2.0 moles of templating agent per mole of Al$_2$O$_3$ The reaction mixture is placed in a reaction vessel inert toward the reaction system and heated at a temperature of at least about 100° C., preferably between 100° C. and 300° C. until a solid crystalline reaction product is obtained, usually a period of from 2 hours to 2 weeks. The crystalline product is then recovered by any convenient method, such as by filtration or centrifugation, washed with water and dried at a temperature generally between ambient and 100° C. in air.

Subsequent to the discovery of aluminophosphate molecular sieves it was discovered that by incorporating reactive sources of other elements which are capable of forming framework tetrahedral oxide units into the reaction mixture, other aluminophosphate-based crystalline molecular sieves can be produced. Silicon has been found to be especially suitable for incorporation into the aluminophosphate frame-work, and a subgeneric class of molecular sieves commonly known by the acronym of "SAPO's" is disclosed in U.S. Pat. No. 4,440,871 issued Apr. 3, 1984 to Lok et al. Similarly "MeAPO" molecular sieves in which "Me" represents at least one of Mg, Mn, Co and Zn are disclosed in U.S. Pat. No. 4,567,029, issued Jan. 28, 1986; crystalline ferroaluminophosphates (FeAPO) are disclosed in U.S. Pat. No. 4,554,143, issued Nov. 19, 1985; titanium aluminophosphates (TAPO) are disclosed in U.S. Pat. No. 4,500,651, issued Feb. 19, 1985. Certain molecular sieves denominated "ELAPO's" and "ELAPSO's" are also known in the art, and disclosed in EPC Patent Application 85104386.9 (Publication No. 0158976, published Oct. 13, 1985) and EPC Publication No. 0159624 (published Oct. 30, 1985) respectively.

Collectively the aluminophosphate-based molecular sieves, sometimes referred to in the art as "non zeolitic molecular sieves" or "NZMS", can be represented by the empirical chemical composition on an anhydrous basis by the following formula in which the terms "Q" is inclusive of the elements represented by "EL" in the acronyms ELAPO and ELAPSO:

mR: (Q$_w$Al$_x$P$_y$Si$_z$)O$_2$ where "Q" represents at least one element present as a framework oxide unit "QO$^n$$_2$" with charge "n" where "n" may be −3, −2, −1, 0 or +1; "R" represents at least one organic templating agent present in the intracrystalline pore system; "m" represents the molar amount of "R" present per mole of (Q$_w$Al$_x$P$_y$Si$_z$)O$_2$ and has a value from zero to about 0.3; and "w", "x", "y", and "z" represent the mole fractions of QO$^n$$_2$, AlO$^-$$_2$, PO$^+$$_2$, SiO$_2$, respectively, present as framework oxide units. "Q" is characterized as an element having a mean "T-O" distance in tetrahedral oxide structures between about 1.51 Angstroms and about 2.06 Angstroms. "Q" has a cation electronegativity between about 125 kcal/gm-atom to about 310 kcal/gm-atom and "Q" is capable of forming stable Q—O—P, Q—O—Al or Q—O—Q bonds in crystalline three dimensional oxide structures having a "Q—O" bond dissociation energy greater than about 59 kcal/gm-atom at 298° K; and said mole fractions being within the limiting compositional values or points as follows:

(w+z) is equal to 0 to 98 mole percent;
y is equal to 1 to 99 mole percent; and
x is equal to 1 to 99 mole percent;

It will be readily understood by those skilled in the art that the compositional limits for each individual aluminophosphate-based molecular sieve encompassed by the aforesaid formula will depend to a considerable extent upon the net charge associated with each species of TO$_2$ unit present. Thus a crystalline AlPO$_4$ molecular sieve will necessarily contain essentially an equal number of AlO$_2$ and PO$_2$ units, whereas a crystalline SAPO molecular sieve can contain 98 mole percent SiO$_2$ units with the remainder being AlO$_2$ and PO$_2$ units.

As in the case of the general class of aluminosilicate zeolite molecular sieves, it has been observed that the thermal and hydrothermal stability of members of the aluminophosphate-based molecular sieves varies among the structural species which collectively comprise the generic class. For example, in Example 51 of the aforesaid U.S. Pat. No. 4,310,440, there is reported the preparation of the species denominated AlPO$_4$-21 using a variety of different reaction mixtures, organic templating agents and reaction times and temperatures. In each instance the AlPO4-21 product was isolated from the reaction mixture and dried in air at 110° C. Upon calcination in air at temperatures of from 500°-600° C., however, it was found that the AlPO4-21 products converted to the crystal structure of AlPO4-25 which, from a comparison of the X-ray powder diffraction patterns of the two species, is markedly different from its precursor, AlPO4-21. A similar conversion upon calcination was noted in the case of AlPO4-23 which resulted in the formation of AlPO4-28 at 600° C. AlPO4-31, on the other hand retained its characteristic as-synthesized crystal structure even when calcined in air at a temperature as high as 1000° C.

One of the more remarkable changes in crystal structure concerning aluminophosphate-based molecular sieve compositions involves the subgeneric group identified hereinafter as APMS-54. "APMS" is an acronym for "aluminophosphate-based molecular sieve" and the designation "−54" indicates the crystal structure characterized by the X-ray powder diffraction data set forth in Table I, or more succinctly by at least the d-spacings of Table II. It is believed that the APMS-54 topology is that of the Smith and Dytrych hypothetical net 81(1) published in *Nature,* 309 pg. 607 (1984), although the X-ray pattern of AlPO4-54 is not in perfect agreement with the simulated pattern for that structure.

TABLE I

| 2θ | d,A | Relative Intensity |
|---|---|---|
| 5.3 ± 0.2 | 16.07–17.32 | VS |
| 9.3 ± 0.2 | 9.31–9.72 | W |
| 10.7 ± 0.25 | 8.08–8.47 | M |
| 14.3 ± 0.3 | 6.07–6.33 | W |
| 16.1 ± 0.3 | 5.40–5.61 | W |
| 18.7 ± 0.3 | 4.67–4.82 | W |
| 21.7 ± 0.4* | 4.02–4.17 | M |
| 21.9 ± 0.4 | 3.99–4.13 | M |
| 22.4 ± 0.4* | 3.90–4.04 | M |
| 22.6 ± 0.4 | 3.87–4.00 | M |
| 23.6 ± 0.4 | 3.71–3.83 | W |
| 24.5 ± 0.4 | 3.58–3.69 | W |
| 24.8 ± 0.4 | 3.53–3.65 | W |
| 26.0 ± 0.4 | 3.38–3.48 | W |
| 27.15 ± 0.4 | 3.249–3.333 | M |
| 28.2 ± 0.4 | 3.126–3.209 | W |
| 28.9 ± 0.4 | 3.048–3.132 | W |
| 29.4 ± 0.4 | 2.998–3.079 | W |
| 30.25 ± 0.4 | 2.917–2.993 | W |
| 30.8 ± 0.4 | 2.867–2.940 | W |
| 32.3 ± 0.4 | 2.739–2.805 | W |
| 32.65 ± 0.4 | 2.710–2.776 | W |
| 34.0 ± 0.4 | 2.607–2.667 | W |
| 35.85 ± 0.4 | 2.478–2.532 | W |
| 37.6 ± 0.4 | 2.368–2.417 | W |
| 38.3 ± 0.4 | 2.327–2.374 | W |
| 41.0 ± 0.4 | 2.181–2.222 | W |
| 48.8 ± 0.4 | 1.852–1.881 | W |
| 49.2 ± 0.4 | 1.838–1.866 | W |
| 49.6 ± 0.4 | 1.824–1.852 | W |
| 55.0 ± 0.4 | 1.658–1.680 | W |

* = doublet

TABLE II

| 2θ | d,A | Relative Intensity |
|---|---|---|
| 5.1–5.5 | 16.07–17.32 | VS |
| 10.45–10.95 | 8.08–8.47 | M |
| 21.3–22.1* | 4.02–4.17 | M |
| 21.5–22.8 | 3.99–4.13 | M |
| 22.0–22.8* | 3.90–4.04 | M |
| 22.2–23.0 | 3.87–4.00 | M |
| 23.2–24.0 | 3.71–3.83 | W |
| 26.75–27.45 | 3.249–3.333 | M |

* = doublet

This X-ray pattern, and all others appearing hereinafter were obtained by use of either a standard X-ray powder diffraction technique or by use of computer-based techniques using a Siemens D-500 X-ray powder diffractometer, available from Siemens Corporation, Cherry Hill, N.J. When the standard X-ray technique is employed, the radiation source is a high-intensity, copper target, X-ray tube operated at 40 Kv and 49 ma. The diffraction pattern from the copper K-alpha radiation and graphite monochromator is suitably recorded by an X-ray spectrometer scintillation counter, pulse height analyzer and strip chart recorder. Flat compressed powder samples are scanned at 2° (2 theta) per minute, using a two second time constant. Interplanar spacings (d) are obtained from the position of the diffraction peaks expressed as 2θ, where θ is the Bragg angle, as observed on the strip chart. Intensities are determined from the heights of diffraction peaks after subtracting background. Relative intensity values, 100 x $I/I_o$, are expressed either numerically or in terms of W (weak), M (medium), S (strong) and VS (very strong). In numerical terms, W=0−10; M=11−20; S=21−50 and VS=51−100.

As will be understood by those skilled in the art, the determination of the parameter 2 theta, irrespective of the technique employed, is subject to both human and mechanical error, which in combination can impose an uncertainty of about 0.4 degree on each reported value of 2 theta. This uncertainty is, or course, also manifested in the reported values of the d spacings which are calculated from the 2 theta values. This imprecision is general throughout the art and is not sufficient to preclude the differentiation of the present crystalline materials from the compositions of the prior art.

The family of aluminophosphate based molecular sieves herein identified as APMS-54 includes all of the species within the family which possess the same characteristic crystal structure but which vary in the structural oxide framework units which may be present in addition to $AlO_2$ and $PO_2$. For example AlPO4-54 is formed only of $AlO_2$ and $PO_2$ units, SAPO-54 is formed of $SiO_2$, $AlO_2$ and $PO_2$ units, CoAPO-54 is formed of $CoO_2$, $AlO_2$ and $PO_2$ units, and so forth.

From recent publications and pre prints of publications by M. E. Davis et al. concerning the zeolite and molecular sieve art, it is also apparent that an aluminophosphate based molecular sieve family denominated VPI-5 is the same, or very similar to, certain of the APMS-54 compositions involved herein. These publications include *C&EN,* Mar. 21, 1988, pgs. 22–24 and Davis et al., *Nature,* 331, pg. 698 (1988). The available documented evidence indicates that the first reported synthesis of an APMS-54 species appears as the preparation described in Example 29 of U.S. Pat. No. 4,310,440. In that synthesis AlPO4-54 was produced as the major product prior to drying the recovered and washed solids at 115° C. Upon drying the AlPO4-54 crystals at 115° C. a very rapid and essentially complete conversion to the AlPO4-8 species occurred as evidenced by the X ray powder diffraction pattern of the dried composition. It has subsequently been reported (Research Notes; Zeolite Research Program, Georgia Institute of Technology, Fall 1988, Vol. 2, No.2) that the preparation disclosed in U.S. Pat. No. 4,673,559 as MCM 9 is a mixture containing VPI-5 and SAPO-11. This composition, as well as the others of the APMS-54 family, are also found to be unstable toward dehydration at elevated temperatures.

SUMMARY OF THE INVENTION

We have now discovered a method for stabilizing APMS-54 compositions against crystal structure transformations which comprises contacting APMS-54 crystals with a solution, preferably an aqueous solution, of boric acid or a salt of boric acid in proportions such that the crystals contain at least about 6 ppm (wt.), preferably at least 15 ppm and more preferably at least 150 ppm of extraneous boron on a weight basis. For reasons which have not been fully elucidated, the boron-containing APMS-54 can be subjected to calcination at elevated temperatures, in some instances as high as 1000° C., when in the hydrated state with much less conversion to the crystal structure characteristic of AlPO$_4$-8 than heretofore observed in the case of untreated APMS-54 compositions, and with little degradation to the amorphous form. Preferably the temperature during the calcination procedure is ramped from room temperature to the final calcination temperature at a rate of about 5° C./min. or less. The invention also encompasses the novel boron-containing stabilized APMS-54 products.

DETAILED DESCRIPTION OF THE INVENTION

The as-synthesized (i.e. unstabilized) aluminophosphate-based molecular sieves suitably stabilized in accordance with the present invention and which are encompassed by the term APMS-54 include all of members of the family which have the characteristic crystal structure of AlPO$_4$-54 and accordingly have an X-ray powder diffraction pattern substantially as set forth in Table I, or contain at least the d-spacings set forth in Table II above, and have a chemical composition $$mR: (Q_wAl_xP_ySi_z)O_2$$

where "Q" represents at least one element present as a framework oxide unit "QO$^n$$_2$" with charge "n" where "n" may be $-3$, $-2$, $-1$, 0 or $+1$; "R" represents at least one organic templating agent present in the intracrystalline pore system; "m" represents the molar amount of "R" present per mole of $(Q_wAl_xP_ySi_z)O_2$ and has a value from zero to about 0.3; and "w", "x", "y" and "z" represent the mole fractions of QO$^n$$_2$, Al$^-$$_2$, , PO$^+$$_2$ and SiO$_2$ respectively, present as framework oxide units. "Q" is characterized as an element having an atomic weight of greater than twenty (20) and a mean "T-O" distance in tetrahedral oxide structures between about 1.51 Angstroms and about 2.06 Angstroms. "Q" has a cation electronegativity between about 125 kcal/gm-atom to about 10 kcal/gm-atom and "Q" is capable of forming stable Q—O—P, Q—O—Al or Q—O—Q bonds in crystalline three dimensional oxide structures having a "Q—O" bond dissociation energy greater than about 59 kcal/gm atom at 298° K; and said mole fractions being within the limiting compositional values or points as follows:

(w+z) is equal to 0 to 98 mole percent;
y is equal to 1 to 99 mole percent; and
x is equal to 1 to 99 mole percent;

In the formula when Q is present, it is preferably at least one of the elements arsenic, chromium, cobalt, gallium, germanium, iron, magnesium, manganese, titanium, vanadium or zinc, and is more preferably cobalt, magnesium, manganese or zinc. Particularly preferred species are those in which "w" has a value of zero or in which both "w" and "z" have a value of zero, i.e. AlPO$_4$-54 and SAPO-54.

The APMS-54 compositions are synthesized in accordance with the procedures known in the art, especially as disclosed in the various publications cited in the Prior Art section hereinabove. Convenient encyclopedic disclosures of synthesis techniques appear in commonly assigned copending application Ser. No. 213,230 filed June 29, 1988 by W. C. Mercer et al., and in U.S. Pat. No. 4,740,650 issued Apr. 26, 1988 to R. J. Pellet et al., the specifications of which are incorporated herein by reference. In more recent and as yet unpublished syntheses, we have observed that ethylbutylamine is the preferred templating agent for the formation of the 54-structure, but other templating agents are also suitable. These include dipropylamine, dipentylamine, dibutylamine, tributylamine, tetrabutylammonium ion, tetrapentylammonium ion and N-methyl-2-heptylamine.

The phosphorus source in the reaction mixture is ortho phosphoric acid (H$_3$PO$_4$) in the form of an 85% aqueous solution. The aluminum source is advantageously a pseudo boehmite phase such as Pural (Condea). In synthesis procedures involving stirring of the reaction mixture it has been found that the use of the alumina available under the tradename "Versal 250" (Kaiser) resulted in thinner and more easily stirred mixtures.

Silica sources for the reaction mixture when silicon is to be included in the 54-structure can be tetraethylorthosilicate, aqueous silica sols and solid reactive amorphous silicas such as the fumed silicas sold under the tradenames Cab-o-Sil (Cabot) and HiSil (PPG), the latter two being preferred.

The source of the elements represented by "Q" in the composition formula above is usually a reactive compound of the element, particularly the oxides, hydroxides and salts. The acetates, sulfates, halides and nitrates of these elements are generally suitable. In some instances, for example titanium, the alkoxides and water soluble chelates are also useful.

In the preparation of AlPO$_4$-54, the reaction mixture generally comprises per mole of Al$_2$O$_3$ about 0.5 to 1.5 moles of P$_2$O$_5$, 0.2 to 2.0 moles of the organic templating agent and 7 to 100 moles of water. For ELAPO-54, in the reaction mixture expressed in terms of molar ratios.

$$aR: (Q_wAl_xP_ySi_z)O_2:bH_2O;$$

"a" has a value of from greater than zero to 6; "b" has a value of 2 to 500 and the values of "w", "x" and "y", which represent the mole fractions, respectively of the elements Q, aluminum and phosphorus, preferably have values of 0.01 to 0.98; 0.01 to 0.60; and 0.01 to 0.60 respectively. The value of "z" is zero. In the case of SAPO-54, the reaction mixture is the same as for ELAPO, above, but the value of "w" is zero and the value of "z" is 0.01 to 0.98.

For ELAPSO-54, in the reaction mixture expressed in terms of molar ratios

$$aR: (Q_wAl_xP_ySi_z)O_2: bH_2O$$

The values of "a" and "b" are the same as in the case of ELAPO-54 and the values of "x", "y" and "z + w" are 0.10 to 0.55; 0.10 to 0.55; and 0.01 to 0.98, respectively. In synthesizing APMS-54 compositions there is observed to be a tendency to produce a number of crystalline impurities. Low shear mixing and avoiding the presence of nucleation sites, such as in an overstirred or a seeded mixture help to prevent the formation of these impurities. Also certain reactants appear to function better depending upon whether the reaction mixture is agitated or digested quiescently. For example Cab-o-sil has produced a pure SAPO-54 from a quiescent digestion and HiSil has yielded an essentially pure SAPO-54 from a stirred digestion. The temperature of the digestion should be kept in the range of 125 to 175° C. in order to reduce impurity formation. To synthesize the 54-structure, a balance should be reached between low temperature digestion, which favors the formation of an aluminophosphate having an X-ray diffraction pattern resembling that of H3 of D'Yvoire [Bulletin Soc. Chemical France, 1762 (1961), and higher temperatures which favor the formation of compositions having the structure of $AlPO_4$-11 and $AlPO_4$-41.

In treating the APMS-54 composition to stabilize it against structural rearrangement, the crystals are contacted with a solution, preferably an aqueous solution of an effective amount of boric acid or a salt of boric acid. It is preferred that the stabilizing treatment be carried out after the synthesis procedure is complete, the product crystals are isolated from the reaction mixture, and washed with water to remove the occluded components of the reaction mixture. It is possible to impart the boric acid or the boric acid salt to the synthesis mixture in the preparation of an APMS-54 so that the stabilization treatment is carried out in situ during and after the formation of the APMS-54 crystals. In such a case, however, it is essential that the product crystals are not washed in a manner as to remove the extraneous boron to levels below which stabilization is not accomplished. By the term "boric acid" as used herein is meant any of tetraboric acid ($H_2B_4O_7$); metaboric acid ($HBO_2$) and orthoboric acid $H_3BO_3$. Orthoboric acid is converted to metaboric acid at temperatures in excess of 70° C., and metaboric acid converts to tetraboric acid at about 140° C. A wide variety of salts of boric acid and salts are known including those of the alkali metals, the alkaline earth metals, thallium and magnesium. The ammonium salts are also commercially available. Most of the series of alkali borates have the formula $M_2O$ $mB_2O_3$ in which "m" has the values of 1 to 4, except in the case of potassium in which "m" can be as high as 6, and is the case of ammonium borate in which the value of "m" is either 2 or 4. In addition to forming aqueous solutions, the borates are readily soluble in organic hydroxy compounds, particularly alcohols.

The concentration of boric acid or boric acid salt in the treating solution is not a narrowly critical factor, but is preferably at least 1.0 weight per cent. The temperature of the treating solution should not exceed about 90° C. and is preferably within the range of about 30° C. to 80° C. Aqueous solutions of orthoboric acid having concentrations of the acid in the range of 1 to 10 weight per cent and a temperature of 60° to 75 ° C. are particularly preferred treating solutions. Preferably at least sufficient treating solution to provide 2 to 3 moles of boron compound per 100 grams of APMS-54 (fully hydrated form) is employed. An effective amount of solution is that which is sufficient to stabilize the hydrated APMS-54 against conversion to other structural form(s) when subjected to calcination temperatures of above 100° C. When employing solutions of boric acid salts, it is preferred that the pH of the salt solution be adjusted, if necessary, to within the range of 3 to 5. In those instances in which the stabilized APMS-54 composition is to be subjected to high temperatures in use, it is advantageous to use either boric acid or a boric acid salt free of alkali metal to avoid the possibility of crystal degradation due to fluxing.

The resulting stabilized APMS-54 contains at least 6 ppm, and preferably at least 150 ppm by weight of boron. In the present specification this stabilizing boron is referred to as "extraneous" boron to distinguish it from any framework boron which may be present. While the precise manner in which the boron is incorporated into APMS-54 crystals is not known, it appears likely that the boron or boron-containing moiety is chemically bonded to the crystal lattice, possibly at certain defect sites thereof.

The following examples are illustrative of the processes and products of the present invention as well as advantageous methods for the synthesis of the APMS-54 starting materials. In those instances in which a boron content is reported for the product, the analytical procedure employed was capable of detecting about 3.7 ppm (weight) of boron. Accordingly where the boron contact is stated to be "nil", the boron content was too low to be accurately determined or was not present at all. Where measurable amounts of boron were present, the accuracy of the reported numerical value is about ±2.5 per cent.

EXAMPLE 1

PREPARATIONS OF $AlPO_4$-54

(a) Quiescent preparation: In a plastic beaker were combined 46.12 grams of aqueous orthophosphoric acid (85% by weight H ) and 117.89 grams of water. To the phosphoric acid solution was slowly added 28.93 grams of a pseudo boehmite type alumina (70.6 wt. % $Al_2O_3$), available under the tradename Pural (Condea), with stirring. A magnetic stirrer was utilized until the mixture became thick, and then mixing and addition of alumina was continued with hand stirring using a spatula. Ethylbutylamine in an amount of 20.24 grams was added to the resulting mixture and mixed in by hand stirring. The resulting mixture had the following composition:

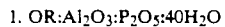

1. $OR:Al_2O_3:P_2O_5:40H_2O$

The mixture was then digested for 4 hours in a stainless steel polytetrafluoroethylene-lined pipe bomb in a 150° C. oven. At the end of the digestion period the bomb was quenched to room temperature using cold water and the solid product recovered by filtering and water-washing on a Buchner funnel. The recovered solids were dried in air at ambient room temperature in a hood. The dry yield was about 25 grams of pure $AlPO_4$-54 which exhibited an X-ray powder diffraction pattern essentially identical to that set forth in Table I.

(b.) Using essentially the same manipulative procedure as described in part (a) above, the same digestion temperature, a four hour digestion time, and eguimolar quantities of $Al_2O_3$ , $P_2O_5$, and organic templating agent, and 40 moles of H₂O per mole of Al₂O₃, seven additional syntheses of AlPO₄-54 were carried out, each synthesis employing one of the seven following organic templating agents:

(i) n-tetrabutylammonium hydroxide
(ii) n-pentylammonium hydroxide
(iii) n-dibutylamine
(iv) n-dipentylamine
(v) N-methyl-2-heptylamine
(vi) n-dipropylamine
(vii) n-tributylamine In each instance the AlPO₄-54 product was recovered in good yield (as evidenced by the X-ray diffraction data) at ambient (room) temperature and washed with water.

(c.) Stirred preparation: Orthophosphoric acid (85%) and water were combined in a plastic beaker in amounts of 110.69 grams and 228.68 grams, respectively, to which was added 57.87 grams of alumina (Versal 250 brand ; 70.6 weight per cent Al₂O₃) with magnetic stirring. Thereafter 20.2 grams of ethylbutylamine was added and combined, followed by 111.2 grams of tributylamine. The pH of the final mixture was 4.80 and had the following composition:

0.5 EtBuNH:1.5 Bu₃N:Al₂O₃:P₂O₅:40 H₂O

The entire mixture was sealed in a 0.6 liter stainless steel stirred reactor and was heated from 40°–80° C. over one hour, then 80°–130° C. over one hour, then digested at 130° C for one hour. The mixture thickened to form a solid plug soon after reaching digestion temperature, stopping the stirring motor several times over the course of the digestion. At the end of digestion the reactor was quenched under cold running water after it had convectively cooled to 100° C. The contents were crushed to pieces of a manageable size with a pestle in a large beaker, then centrifuged and washed twice, after which the product became filterable and was thereafter isolated by filtration and washing with several liters of distilled/deionized water and dried in air at room temperature. The dry yield was about 165 grams of pure AlPO₄-54 as determined by X ray analysis. The chemical analysis revealed the product to contain 0.87 wt. % C., 0.6 wt. % N, 32.2 wt. % Al₂O₃, 43.6 wt. % P₂O₅ and 25.7 wt. % LOI, giving a product composition in terms of molar oxide ratios of:

1.0 Al₂O₃:1.0 P₂O₅:4.3 H₂O (d) Using the general procedure of part (c) above, the first six different organic templating agents listed in part (b) above can be employed in combination with tributylamine to prepare AlPO₄-54. From 0.5 to 1.0 mole of the part (b) templating agent per mole of Al₂O₃ supplemented with sufficient tributylamine to make 2.0 combined moles of templating agent per mole of Al₂O₃ are employed. In digestion, the reaction mixture is heated to 125°–130° C. over the period of two hours, and digested at the final temperature for one additional hour.

EXAMPLE 2

SAPO-54 Synthesis

A reaction mixture was prepared by combining 92.24 grams of 85% H₃PO₄ and 235.77 g. of H₂O into a beaker. Pseudo boehmite. 57.87 g., was added slowly while mixing, then 7.2 g. SiO₂(Cab-O-Sil EH5) was added as the mixture was mixed. Ethylbutylamine. 50.0 g., was then added and the mixture was mixed until homogeneous. The chemical composition of the reaction mixture was as follows:

1.25R:0.3 SiO₂ :Al₂O₃:P₂O₅:40 H₂O

Part of the mixture was digested for 44 hr. at 125 C. in a polytetrafluoroethylene-lined pipe bomb. The bomb was then cooled and the product was isolated by centrifugation and washed with distilled water then dried at room temperature. Chemical analysis of the product showed the product to contain 0.27 wt. % C, 0.05 wt. % N, 33.6 % Al₂O₃, 34.7 wt. % P₂O₅, 7.36 wt. % SiO₂, and 23.6 wt. % LOI, giving a product composition in molar oxide ratios of:

1.0 Al₂O₃:0.74 P₂O₅:0.18 SiO₂:3.9 H₂O

The major component of the product had an x-ray powder diffraction pattern characterized by the following data wherein "I" is the intensity and "d" the interplanar spacing.

TABLE II

| 2-theta | d,A | 100 × I/Io |
|---|---|---|
| 5.3 | 16.5 | 100 |
| 10.75 | 8.23 | 14 |
| 14.3 | 6.19 | 6 |
| 16.15 | 5.49 | 2 |
| 18.7 | 4.75 | 6 |
| 21.7 | 4.10 | 10 |
| 21.9 | 4.06 | 17 |
| 22.4 | 3.97 | 10 |
| 22.55 | 3.94 | 11 |
| 23.6 | 3.77 | 8 |
| 24.5 | 3.64 | 3 |
| 24.8 | 3.59 | 3 |
| 27.2 | 3.28 | 12 |
| 28.2 | 3.17 | 5 |
| 30.3 | 2.953 | 7 |
| 32.7 | 2.740 | 7 |
| 34.0 | 2.636 | 2 |

EXAMPLE 3

CoAPO-54 SYNTHESIS

A reaction, mixture was prepared by combining 46.1 grams of 85% H₃PO₄ and 97.5 g. of H₂O. In a separate vessel 2.5 g. of cobalt acetate tetrahydrate was dissolved in 20 g. of water. Pseudo-boehmite, (Pural), 27.5 g., was added to the phosphoric acid solution and mixed until homogeneous, after which the cobalt acetate solution was added with mixing. Ethylbutylamine, 20.24 g., was then added to the mixture and stirred until homogeneous, producing a reaction mixture having a composition as follows:

1.0R:0.05CoO:0.95 Al₂O₃:P₂O₅:40 H₂O

Part of the mixture was digested at 150 C. for 4 hr in a polytetrafluoroethylene - lined bomb. The product was isolated by centrifugation and washed with distilled water, then dried at room temperature. The major component of the product had an x-ray powder diffraction pattern essentially the same as that in Example 2. Minor impurities included CoAPO-5 and CoAPO-11 as disclosed in U.S. Pat. No. 4,567,029, Examples 89 and 93 respectively.

EXAMPLE 4

(a) As evidence of the instability of the as-synthesized APMA-54 structure, a sample of AlPO$_4$-54 was synthesized using eguimolar proportions of ethylbutylamine, as the templating agent, Al$_2$O$_3$ (Pural) and P$_2$O$_5$ (orthophosphoric acid). The reaction mixture was prepared with 40 moles of water per mole of alumina and in accordance with the procedure set forth in Example 1(a) above. The digestion temperature was 150 and the digestion time was 4 hours. Essentially pure AlPO$_4$-54 (as determined from X-ray data) was recovered by filtration and washing with water at ambient room temperature. While still in the form of the damp filter cake the sample was inserted into an air oven at 350° C. for 0.5 hour. Upon removal it was found by X-ray diffraction analysis that the sample contained no AlPO$_4$-54 and consisted essentially of AlPO$_4$-8 (as described in Example 27 of U.S. Pat. No. 4,310,440), with an overall crystallinity of 91 per cent as compared to a laboratory standard.

(b) A second sample of AlPO$_4$-54 having a purity of about 92% and containing nil boron was prepared in accordance with the procedures reported in part (a) above. This filter cake was allowed to dry at ambient room temperature (22° C.) and humidity. This sample while still in the hydrated state was subjected to steaming at 600° C. using one atmosphere of 100% steam for 4 hours. By X-ray analysis it was determined that the starting AlPO$_4$-54 had completely converted to AlPO$_4$-8.

(c) A sample of AlPO$_4$-54 having a high degree of purity and containing nil boron was prepared in accordance with the general procedures of part (a) supra. The filter cake was allowed to dry at ambient room temperature and humidity to remove water adhering to the outer surfaces of the crystals. The dried sample still retaining adsorbed water of hydration was then placed in an air oven at a temperature of about 440° to 450° C. for about 2 hours. Upon X-ray analysis it was found that the sample have converted to AlPO$_4$-8.

(d) A sample of AlPO$_4$-54 was prepared using a mixture of 0.5 mole ethylbutylamine, 1.5 moles tributylamine, 1.0 mole of H$_3$PO$_4$, 1.0 mole of Al$_2$O$_3$ (Pural) and 40 moles of H$_2$O. The digestion and crystallization were carried out at 150° C. for 1 hour with stirring in an autoclave. The recovered product was 71% AlPO$_4$-54 by X-ray analysis.

(e) The preparation of part (d) above was repeated except that the digestion and crystallization temperature was 125° C. The resulting AlPO$_4$-54 product was essentially 100% pure, having a crystallinity of 104 per cent, by comparison with a laboratory standard, and nil boron content.

(f) Eight samples of the AlPO$_4$-54 prepared as in part (e) above were, prior to any dehydration, washed with an aqueous ammonium acetate solution, ethanol, distilled water and aqueous boric acid solutions, respectively, at various temperatures and for various periods of time. Thereafter each washed sample was filtered, washed with water and dried at ambient temperature and then inserted into an air oven at a temperature of from 440 to 450° C. for 2 hours. Analysis of similar samples similarly treated with boric acid solution showed the presence of from 918 to 1250 ppm (wt.) boron. These products are identified in Table III below as f-1 through f-8. Also two samples of the composition prepared in part (d) above were treated with aqueous solutions of acetic acid and boric acid, respectfully. These products are identified as f-9 and f-10, respectively in Table III, which also gives particulars of the treatment procedures and the products.

TABLE III

| Sample | Washing Medium | Washing Temp. °C. | Washing Time, hr. | Product # % AlPO4-54 | Product # % AlPO4-8 |
|---|---|---|---|---|---|
| f-1 | NH$_4$OAc,5% | 55 | 1.5 | 37 | 75 |
| f-2 | NH$_4$OAC,5%* | 70 | 1.4 | 23 | 60 |
| f-3 | NH$_4$OAc,5%, then H$_3$BO$_3$ | 70 70 | 1.5 1.5 | 57 | 32 |
| f-4 | Distil. H$_2$O | 65 | 1.0 | 56 | 0 |
| f-5 | Ethanol | 25 | 0.75 | 13 | 0 |
| f-6 | H$_3$BO$_3$,4% | 55 | 1.5 | 95 | 8 |
| f-7 | H$_3$BO$_3$,4% | 60 | 1.5 | 90 | 6 |
| f-8 | H$_3$BO$_3$,4% | 65 | 1.0 | 77 | 5 |
| f-9 | HOAc, pH = 5.4 | 80 | 1.5 | 54 | 61 |
| f-10 | H$_3$BO$_3$,4% | 80 | 1.5 | 78 | 43 |

\* = pH adjusted to 5.4 with acetic acid
# = X-ray peak areas are compared to laboratory standard X-ray patterns. Use of this method can result in the total crystallinity exceeding 100%. The method reliably indicates the relative amounts of phases in a given mixture, however.

It is readily apparent from the data in Table III, above, particularly by comparison with Examples 4(a) and 4(b), that the washing procedure involving boric acid results in an AlPO$_4$-54 of significantly increased stability toward calcination in the hydrated state. Sample f-3 is of particular interest since the boric acid solution was able to stabilize AlPO$_4$-54 even after treatment with ammonium acetate, thus establishing that the ammonium acetate is not harmful to the crystal structure -- merely ineffective as a stabilizing agent. The treatment with distilled water was apparently able to inhibit the formation of AlPO$_4$-8, but permitted much of the AlPO$_4$-54 to become amorphous.

(g) Two portions of the same synthesis sample of AlPO$_4$-54 were treated respectively with an aqueous acetic acid solution (pH=5.4) at 80° C. for 1.5 hours and with an aqueous boric acid solution (4%) at 80° C. for 1.5 hours, followed by filtering, washing and drying at ambient temperatures. The acetic acid treated product exhibited less overall crystallinity than the boric acid treated product and contained only 54% AlPO$_4$-54. The boric acid treated product contained 78% AlPO$_4$-54. On the basis of crystallinity, the acetic acid treated product contained 61% AlPO$_4$-8 and the boric acid treated product contained 43% AlPO$_4$-8, indicating that at 80° C. the temperature of the boric acid treatment was too high for optimal stabilization.

What is claimed is:

1. Process for stabilizing a crystalline aluminophosphate composition against thermally induced alternation of the framework structure, said compositions having an x-ray powder diffraction pattern containing at least the following d-spacings:

| 2θ | d,A | Relative Intensity |
|---|---|---|
| 5.1–5.5 | 16.07–17.32 | VS |
| 10.45–10.95 | 8.08–8.47 | M |
| 21.3–22.1* | 4.02–4.17 | M |
| 21.5–22.8 | 3.99–4.13 | M |
| 22.0–22.8* | 3.90–4.04 | M |
| 22.2–23.0 | 3.87–4.00 | M |
| 23.2–24.0 | 3.71–3.83 | W |

| 2θ | d,A | Relative Intensity |
|---|---|---|
| 26.75-27.45 | 3.249-3.3333 | M |

\* = doublet which process comprises contacting said composition with a solution of boric acid or a salt thereof at a temperature within the range of 20° C. to 90° C. in proportions such that at least 6 ppm by weight of boron is imparted to the aluminophosphate composition, and recovering the boron-containing stabilized product.

2. Process according to claim 1 wherein the aluminophosphate composition is contacted with an aqueous solution of boric acid.

3. Process according to claim 1 wherein the aluminophosphate composition is AlPO$_4$-54 and the contacting solution is an aqueous solution of boric acid.

4. Process according to claim 11 wherein the aluminophosphate composition is SAPO-54 and the contacting solution is an aqueous solution of boric acid.

5. Process according to claim 1 wherein the temperature at which the aluminophosphate composition and the solution containing boric acid or a salt of boric acid are contacted is from 50° C. to 75° C.

6. Process according to claim 1 wherein the contacting the aluminophosphate composition with the solution of boric acid or salt of boric acid, sufficient solution is employed to provide from 2 to 3 moles of boron compound per 100 grams of aluminophosphate composition.

7. Process according to claim 5 wherein the contacting solution is an aqueous solution containing from 1 to 10 weight per cent orthoboric acid.

8. Process according to claim 5 wherein the aluminophosphate composition being stabilized is AlPO$_4$-54.

9. Process according to claim 5 wherein the aluminophosphate composition being stabilized is SAPO-54.

10. Process according to claim 5 wherein the aluminophosphate composition being stabilized is a MeAPO-54 in which "Me" represents at least one metal selected from the group consisting of magnesium, manganese, zinc and cobalt.

11. Process according to claim 5 wherein the aluminophosphate composition being stabilized is FeAPO-54.

12. Process according to claim 5 wherein the pH of the boric acid or boric acid solution is within the range of 3 to 5.

13. Stabilized aluminophosphate crystalline molecular sieve having an X-ray powder diffraction pattern containing at least the following d-spacings:

| 2θ | d,A | Relative Intensity |
|---|---|---|
| 5.1-5.5 | 16.07-17.32 | VS |
| 10.45-10.95 | 8.08-8.47 | M |
| 21.3-22.1* | 4.02-4.17 | M |
| 21.5-22.8 | 3.99-4.13 | M |
| 22.0-22.8* | 3.90-4.04 | M |
| 22.2-23.0 | 3.87-4.00 | M |
| 23.2-24.0 | 3.71-3.83 | W |
| 26.75-27.45 | 3.249-3.333 | M |

\* = doublet said aluminophosphate crystalline molecular sieve containing at least 6 ppm by weight of extraneous boron.

14. Stabilized aluminophosphate crystalline molecular sieve containing at least 150 ppm by weight of extraneous boron and having an X-ray powder diffraction pattern substantially as follows:

| 2θ | d,A | Relative Intensity |
|---|---|---|
| 5.3 ± 0.2 | 16.07-17.32 | VS |
| 9.3 ± 0.2 | 9.31-9.72 | W |
| 10.7 ± 0.25 | 8.08-8.47 | M |
| 14.3 ± 0.3 | 6.07-6.33 | W |
| 16.1 ± 0.3 | 5.40-5.61 | W |
| 18.7 ± 0.3 | 4.67-4.82 | W |
| 21.7 ± 0.4* | 4.02-4.17 | M |
| 21.9 ± 0.4 | 3.99-4.13 | M |
| 22.4 ± 0.4 | 3.90-4.04 | M |
| 22.6 ± 0.4 | 3.87-4.00 | M |
| 23.6 ± 0.4 | 3.71-3.83 | W |
| 24.5 ± 0.4 | 3.58-3.69 | W |
| 24.8 ± 0.4 | 3.53-3.65 | W |
| 26.0 ± 0.4 | 3.38-3.48 | W |
| 27.15 ± 0.4 | 3.249-3.333 | M |
| 28.2 ± 0.4 | 3.126-3.209 | W |
| 28.9 ± 0.4 | 3.048-3.132 | W |
| 29.4 ± 0.4 | 2.998-3.079 | W |
| 30.25 ± 0.4 | 2.917-2.993 | W |
| 30.8 ± 0.4 | 2.867-2.940 | W |
| 32.3 ± 0.4 | 2.739-2.805 | W |
| 32.65 ± 0.4 | 2.710-2.776 | W |
| 34.0 ± 0.4 | 2.607-2.667 | W |
| 35.85 ± 0.4 | 2.478-2.532 | W |
| 37.6 ± 0.4 | 2.368-2.417 | W |
| 38.3 ± 0.4 | 2.327-2.374 | W |
| 41.0 ± 0.4 | 2.181-2.222 | W |
| 48.8 ± 0.4 | 1.852-1.881 | W |
| 49.2 ± 0.4 | 1.838-1.866 | W |
| 49.6 ± 0.4 | 1.824-1.852 | W |
| 55.0 ± 0.4 | 1.658-1.680 | W |

\*doublet

15. Stabilized aluminophosphate composition according to claim 13 having the chemical composition, expressed in terms of mole ratios of oxides and in the anhydrous state of $$Al_2O_3:1 \pm 0.2\ P_2O_5.$$

16. Stabilized aluminophosphate composition according to claim 13 having the chemical composition $$mR:(Q_wAl_xP_ySi_z)O_2$$

where "Q" represents at least one element present as a framework oxide unit "QO$^n$$_2$" with charge "n" where "n" can be −3, −2, −1, 0 or +1; "R" represents at least one organic templating agent present in the intracrystalline pore system; "m" represents the molar amount of "R" present per mole of $(Q_wAl_xP_ySi_z)O_2$ and has a value from zero to about 0.3; and "w," "x," "y" and "z" represent the mole fractions of QO$^n$$_2$, AlO$_2$, PO$_2$ and SiO$_2$, respectively, present as framework oxide units, said mole fractions being with the limiting compositional values:

(w+z) is equal to 0 to 98 mole per cent y is equal to 1 to 99 mole per cent x is equal to 1 to 99 mole per cent "Q" being further characterized as an element having an atomic weight of greater than twenty and a mean "T-O" distance in tetrahedral oxide structures between about 1.51 Angstroms and about 2.06 Angstroms.

17. Stabilized aluminophosphate composition according to claim 16 wherein "Q" represents at least one element selected from the group consisting of magnesium, manganese, iron, cobalt and zinc.

18. Stabilized aluminophosphate composition according to claim 16 wherein the value of "w" is zero.

* * * * *